3,322,629
INJECTABLE AQUEOUS SOLUTIONS CONTAINING A PROTAMINE-ACTIVE COMPOUND
Wilfred James Cecil Dyke, Upton-by-Chester, England, assignor to Evans Medical Limited, Liverpool, Lancashire, England, a British company
No Drawing. Filed June 8, 1964, Ser. No. 373,518
Claims priority, application Great Britain, June 14, 1963, 23,827/63
13 Claims. (Cl. 167—65)

The invention relates to novel pharmaceutical compositions containing protamine.

Protamine is a generic term used to designate a class of low molecular weight proteins which are principally derived from fish sperm and roes. Its molecular weight is in the range 2,000–8,000 and it has been found to possess an unusually large proportion of arginine residues which, by possessing a free guanidine group, cause the protein to be strongly basic. Thus, for example, in salamine from salmon over 80% of its nitrogen content is in the form of arginine and clupeine from herring also possesses a high percentage of arginine. Other protamines include iridine, truttine, fontinine, lacustrine, and sturine, and their occurrence and properties are described in a review by K. Felix (Advances in Protein Chemistry 1960, 15, 1–56). The free base is an oil which is sparingly soluble in water and its salts such as the sulphate, are also sparingly soluble, although their solubility is increased in the presence of acid, e.g. at pH 3.0. As isolated from fish sperm, protamine base is generally in the form of an oil containing about 50% of water; this is normally termed "protamine oil."

Protamine possesses mild anticoagulant properties, but is principally valuable as an antidote to the powerfully anticoagulant compound heparin. It is generally administered where an overdose of heparin has been given and is usually injected intravenously as a 1.0% aqueous solution. In view of the difficult solubility of protamine salts, solutions of these salts at neutral pH are unstable and tend to precipitate out. Consequently, the solutions of protamine sulphate used for injection are at pH 3.0 (Injectio Protaminae Sulphatis B.P.C.). Naturally, such acid solutions cause much pain if injected intramuscularly or subcutaneously and administration is virtually limited to the intravenous route.

I have now found that the concentration of protamine or its salts in aqueous solutions can be greatly increased and stable solutions prepared at pH values well above 3.0, for example, in the range 5–8, by using a water-soluble mono- or di-saccharide or sugar alcohol as a solubilizing agent. In this way concentrations higher than 1.0%, for example of the order of 10%, of protamine can readily be prepared at substantially neutral pH. In formulating protamine and its salts for injection it is clearly useful to exploit this finding either by mixing the protamine and saccharide or sugar alcohol to form a "dry" composition for subsequent dissolution in water or by formulating these substances in aqueous solutions. The saccharide or sugar alcohol should be physiologically acceptable on injection in the relatively large quantities to be administered and should not give rise to undue physiological side effects or tissue irritation at the site of injection.

According to the present invention, therefore, I provide pharmaceutical compositions comprising sterile aqueous solutions containing at least 1.0% by weight calculated as free base of a protamine-active compound selected from the class consisting of protamine and its physiologically compatible acid addition salts and also containing a water-soluble physiologically compatible hydroxy compound selected from the group consisting of mono- and di-saccharides and sugar alcohols as solubilizing agent.

The mono- or di-saccharides used in the compositions of the invention may include, for example, xylose, galactose, fructose, sorbose, sucrose, maltose and the like, lactose and, in particular, glucose being especially effective. The sugar alcohols are preferably those derived from monosaccharides, e.g., mannitol, sorbitol etc.

The pH of the aqueous compositions according to the invention is advantageously in the range 5–8, preferably about neutral, e.g. pH 6.5 to 7.5 and the protamine may thus be present at least partly in salt form in such solutions. The acid addition salts of protamine include, for example, mineral acid salts such as the sulphate, hydrochloride, hydrobromide, nitrate, nitrite, bisulphate, bisulphite salts etc. and organic acid salts such as the acetate, citrate, maleate, lactate, tartrate, benzoate, gluconate etc.

The minimum quantity of saccharide or sugar alcohol to solubilize protamine at a particular concentration may readily be determined experimentally and varies slightly with the nature of the saccharide or sugar alcohol and the source of the protamine. The degree of solubility achieved of course also varies with temperature. In general the ratio of saccharide or sugar alcohol to protamine is preferably greater than 1:1 and for 10% solutions of protamine, the ratio is advantageously about 3:1 or over, the preferred ratio being about 4:1. Higher ratios may be used, e.g. 5:1, if the solubility of the saccharide or sugar alcohol permits, but are not normally necessary.

The concentration of protamine-active compound in the aqueous compositions may, for example, be between 1.0% and about 25 or 30% by weight, calculated as free protamine base depending on the degree of solubilization achieved and concentrations of at least 2.0%, advantageously at least 5.0%, are preferred. The concentration of the saccharide or sugar alcohol may, for example, be between 1.0% and 50% by weight, depending on its solubility. One especially useful composition comprises about 10% protamine and about 40% glucose.

The compositions according to the invention may be prepared in general simply by mixing together the necessary components; it is preferred to dissolved protamine base in an aqueous solution of saccharide or sugar alcohol and to adjust the pH subsequently with a suitable mineral acid e.g. to the range 5–8.

In order that the invention may be well understood we give the following examples by way of illustration only:

*Example 1*

1,950 grams of commercial salmine sulphate was dissolved in 19.5 litres of physiological saline. The solution was heated to 70° C. and maintained at this temperature for 30 minutes during which time its reaction was adjusted to pH 10.4 by the addition of 170 millilitres of 43% w/v caustic soda solution. A small amount of iron-containing precipitate was removed by filtration, and then 300 grams of sodium chloride were dissolved in the filtrate. The solution was allowed to cool and stored at 4° C. for 2 days. At the end of this time the oil which had separated out (N, 13.3% w/w) was collected after siphoning off the upper aqueous layer, and weighed 2,570 grams. 500 grams of the so-obtained aqueous salmine base (c 50% salmine) was dissolved in sufficient 50% w/v dextrose solution so that the final volume was 2,600 millilitres. The resulting solution was adjusted in reaction to pH 7.3 by the addition of 15 millilitres of 2N-hydrochloric acid after which it was filtered through a sterile bacteriological filter and filled into ampoules. The material was submitted to tests for freedom from microbial contamination. The product (N, 2.3% w/v) on intravenous administration to mice had an $LD_{50}$ of 30–44 milligrams/kilo body weight, and was non-pyrogenic to rabbits at a dose level of 20 milligrams/kilo body weight. When tested by the method of the B.P.C. 1959, Appendex XVII, one millilitre of a 1/100 w/v dilution of the solution neutralised 81.1 units of heparin.

*Example 2*

463 grams of aqueous clupeine base obtained by precipitation from the sulphate as for salmine base in Example 1, and having N, 12.2% w/w was dissolved in 50% w/v dextrose solution so that the final volume was 2,260 millilitres. The reaction of the solution was adjusted to pH 7.4 by the addition of 16 millilitres of 2N-hydrochloric acid. The solution, which remained stable on storage at 4° C. was sterilised by filtration and filled into ampoules. The product (N, 2.35% w/v) was assayed by the B.P.C. 1959 Appendix XVII method; one millilitre of a 1/100 dilution of the solution neutralised 84.1 units of heparin.

The procedures of Examples 1 and 2 were repeated using different sugars or sugar alcohols at varying concentrations and the results are shown in the following table:

4. Composition as claimed in claim 1 having a ph in the range 5–8.

5. Composition as claimed in claim 4 having a pH in the range 6.5 to 7.5.

6. Composition as claimed in claim 1 in which said protamine-active compound is an acid addition salt of protamine selected from the class consisting of sulphate, hydrochloride, hydrobromide, nitrate, nitrite, bisulphate, bisulphite, acetate, citrate, maleate, lactate, tartrate, benzoate and gluconate salts.

7. Composition as claimed in claim 1 in which the ratio of the concentration of hydroxy compound to the concentration of protamine active compound calculated as free protamine base is greater than 1:1.

8. Composition as claimed in claim 7 in which said concentration of protamine-active compound is about 10% and said ratio is at least about 3:1.

9. Composition as claimed in claim 8 in which said ratio is about 4:1.

10. Composition as claimed in claim 1 in which the concentration of the hydroxy-compound is between 1% and 50% by weight.

11. Composition as claimed in claim 1 containing up to 30% by weight of protamine active compound calculated as free protamine.

12. Composition as claimed in claim 11 in which the concentration of protamine-active compound is at least 2.0% by weight calculated as free protamine.

13. Composition as claimed in claim 12 in which said concentration of protamine-active compound is at least 5% by weight.

TABLE

| Protamine | Protamine Strength, Percent w/v | Sugar | Sugar Strength, Percent w/v | Results |
|---|---|---|---|---|
| Clupeine oil, N=11.6% w/w | 10% soln | Glucose | 30% soln | Bright clear soln. at room temp. came out at 4° C. |
| Do | 20% soln | do | do | In soln. at room temp. |
| Salmine oil, N=13.3% w/w | 10% soln | do | do | Bright clear soln. comes out in cold. |
| Clupeine oil, N=11.6% w/w | do | do | 40% soln | In soln. at room temp. comes out at 4° C. |
| Salmine oil, N=13.3% w/w | do | do | do | Soln. at room temp. came out at 4° C. |
| Clupeine oil, N=11.6% w/w | do | do | 50% soln | In soln. at room temp. came out at 4° C. |
| Do | do | Xylose | 30% soln | Do. |
| Do | do | Galactose | do | In soln. at room temp. came out at 4° C. |
| Salmine oil, N=13.3% w/w | do | do | do | Soln. at room temp. Insol. at 4° C. |
| Clupeine oil, N=11.6% w/w | do | Fructose | do | Do. |
| Salmine oil, N=13.3% w/w | do | do | do | Do. |
| Clupeine oil, N=10.6% w/w | do | Sorbose | do | Sol. at room temp. and at 4° C. |
| Salmine oil, N=13.3% w/w | do | do | do | Sol. at room temp. came out at 4° C. |
| Clupeine oil, N=11.6% w/w | do | Sucrose | do | In soln. at room temp. came out at 4° C. |
| Salmine oil, N=13.3% w/w | do | do | do | Sol. at room temp. Insol. at 4° C. |
| Clupeine oil, N=10.6% w/w | do | Lactose | do | Sol. room temp. and at 4° C. |
| Salmine oil, N=13.3% w/w | do | do | do | Sol. at room temp. came out at 4° C. |
| Clupeine oil, N=10.6% w/w | do | Maltose | do | Sol. at room temp. and at 4° C. |
| Do | do | Mannitol | do | Sol. at room tems. Solid crysi. at 4° C. |
| Do | do | Mannitol | do | Sol. at room temp. Solid cryst. at 4° C. |
| Salmine oil, N=13.3% w/w | do | do | Not sol. to 30% soln. | |
| Clupeine oil, N=11.6% w/w | do | Sorbitol | 30% soln | In soln. at room temp. came out at 4° C. |
| Salmine oil, N=13.3% w/w | do | do | do | Sol. at room temp. Insol. at 4° C. |

What I claim is:

1. A pharmaceutical composition comprising a sterile aqueous solution containing at least 1.0% by weight calculated as free base of a protamine-active compound selected from the class consisting of protamine and its physiologically compatible acid addition salts and also containing a water-soluble physiologically compatible hydroxy compound selected from the group consisting of mono- and di-saccharides and sugar alcohols derived from monosaccharides as solubilising agent.

2. Composition as claimed in claim 1 in which the hydroxy compound is glucose.

3. Compositions as claimed in claim 1 in which the hydroxy compound is xylose, galactose, fructose, sorbose, sucrose, maltose, lactose, mannitol or sorbitol.

No references cited.

ALBERT T. MEYERS, *Primary Examiner.*

L. B. RANDALL, M. J. COHEN, *Assistant Examiners.*